United States Patent [19]
Balla et al.

[11] 3,883,324
[45] May 13, 1975

[54] METHOD AND APPARATUS FOR AGGLOMERATING DRY DUST PARTICLES IN A GAS STREAM AND SEPARATION

[75] Inventors: Paul A. Balla, Bethlehem; Charles C. Oshinski, Johnstown, both of Pa.

[73] Assignee: Bethlehem Steel Corporation, Bethlehem, Pa.

[22] Filed: May 2, 1973

[21] Appl. No.: 356,536

Related U.S. Application Data
[63] Continuation-in-part of Ser. No. 72,931, Sept. 8, 1970, abandoned.

[52] U.S. Cl. ........................ 55/1; 55/341; 55/418; 55/459; 138/40; 138/44; 266/15
[51] Int. Cl. ............................................ B01d 45/12
[58] Field of Search ............ 55/1, 97, 17, 413–415, 55/418, 341, 459; 138/40, 44; 266/15

[56] References Cited
UNITED STATES PATENTS

| | | | |
|---|---|---|---|
| 1,654,559 | 1/1928 | Spitzglass | 138/44 |
| 1,844,369 | 2/1932 | Ross | 55/418 |
| 2,604,185 | 7/1952 | Johnstone et al. | 55/237 |
| 2,626,820 | 1/1953 | Dons et al. | 138/45 |
| 2,768,705 | 10/1956 | Isserlis | 55/238 |
| 3,636,682 | 1/1972 | Rush | 55/659 |

OTHER PUBLICATIONS
Air Sentry Dust Collector Mfd. North Star Specialties Co. Minneapolis Minn. dtd. 9/68 pages 1–4.

*Primary Examiner*—Bernard Nozick
*Attorney, Agent, or Firm*—Joseph J. O'Keefe; Charles A. Wilkinson

[57] ABSTRACT

Method and apparatus for improving the efficiency of dry dust recovery from moving gases. A constriction is located in a duct carrying "dirty" gas from a dust-producing industrial operation, such as, for example, a blast furnace, to a dust catcher. The constriction may be a central orifice plate or similar means which reduces the cross-sectional flow area in one portion of the duct to about one-fourth of the area of the remaining portions of the duct, and thereby accelerates the velocity of gas flow through that portion of the duct. The location of the constriction when used with a cyclone type dust catcher must be at least five duct diameters upstream of the dust catcher in order to increase dry dust collection and is preferably ten duct diameters upstream from the dust catcher.

8 Claims, 8 Drawing Figures

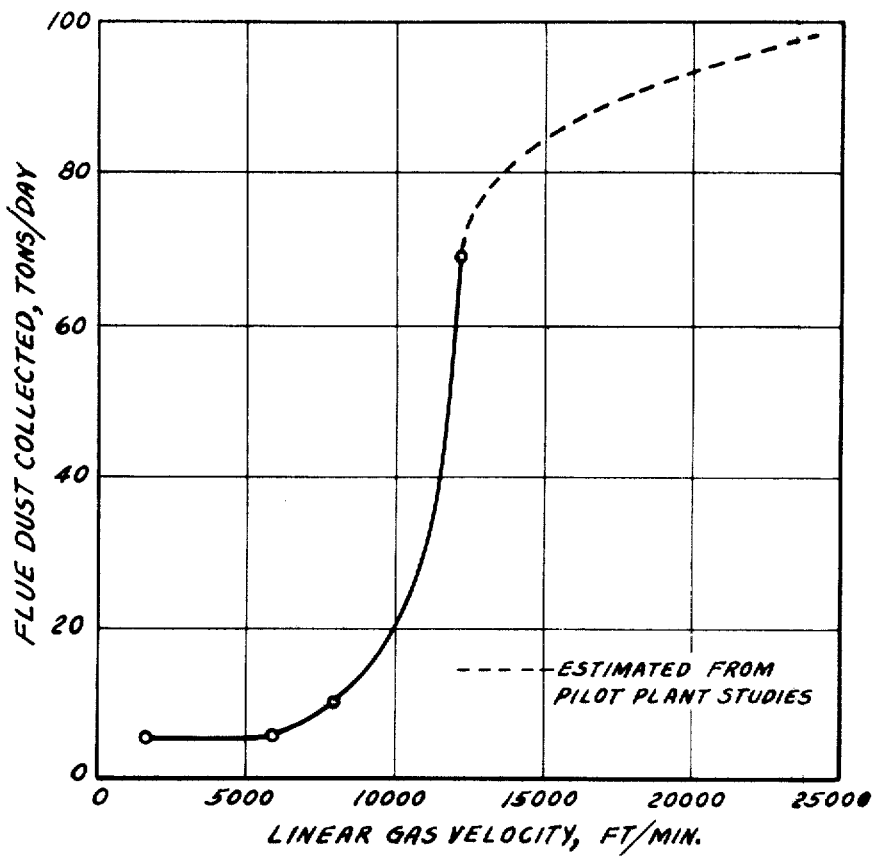
Fig. 1
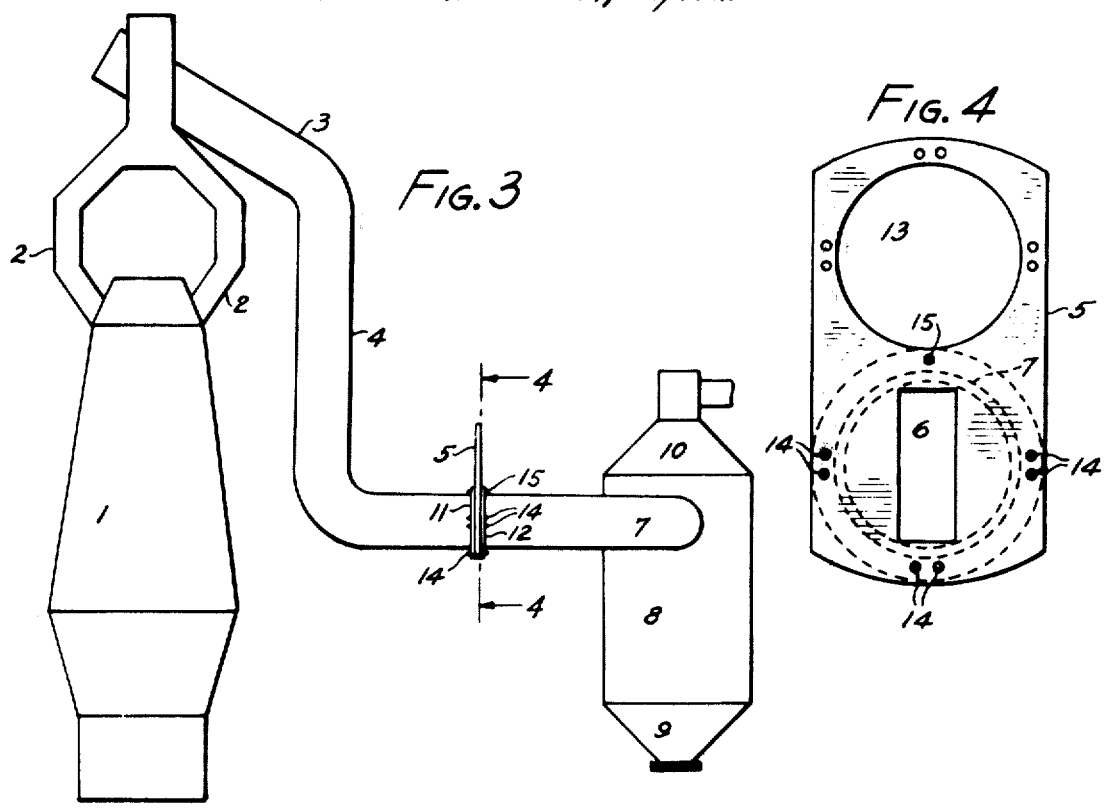
Fig. 3
Fig. 4

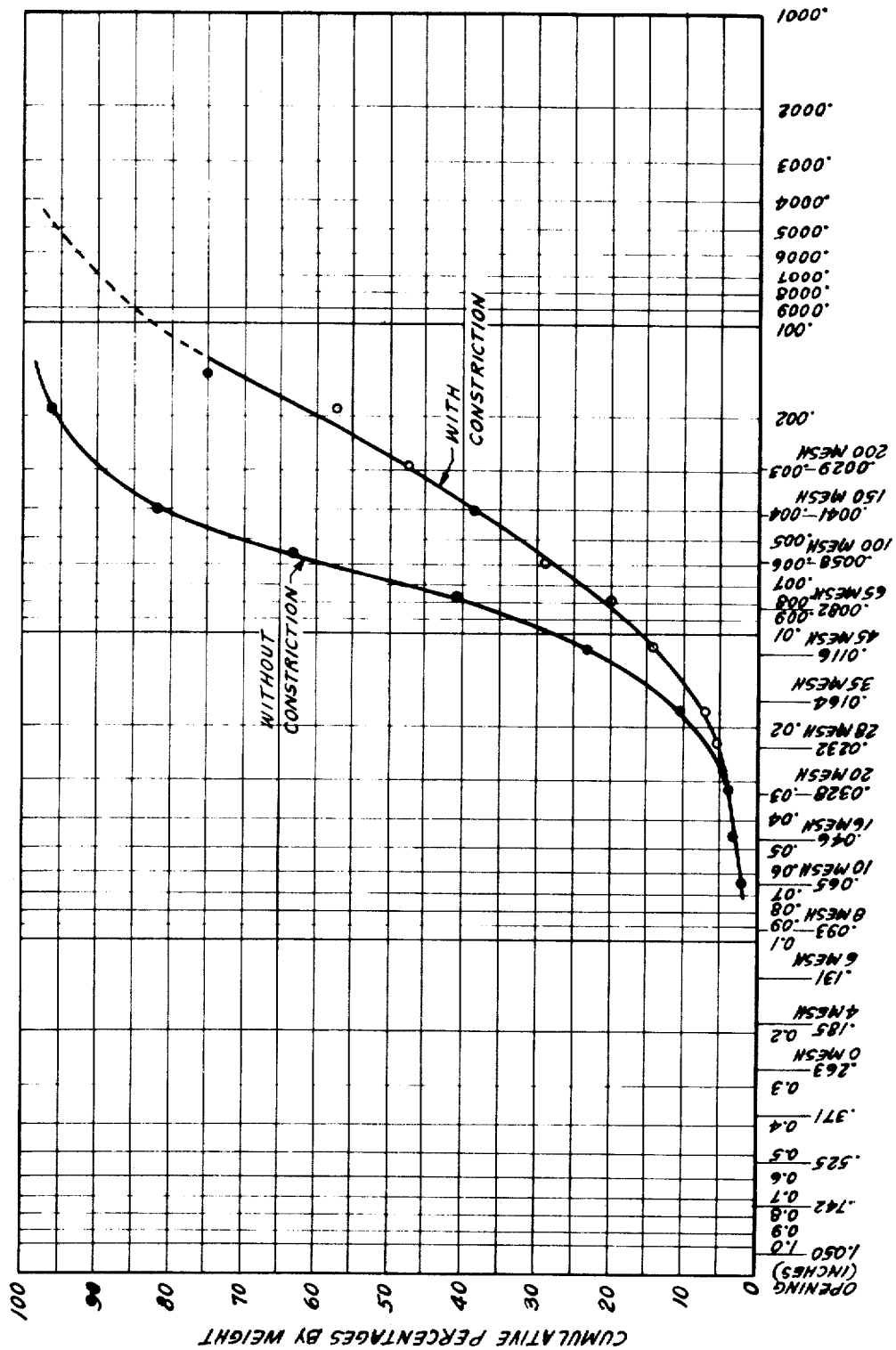

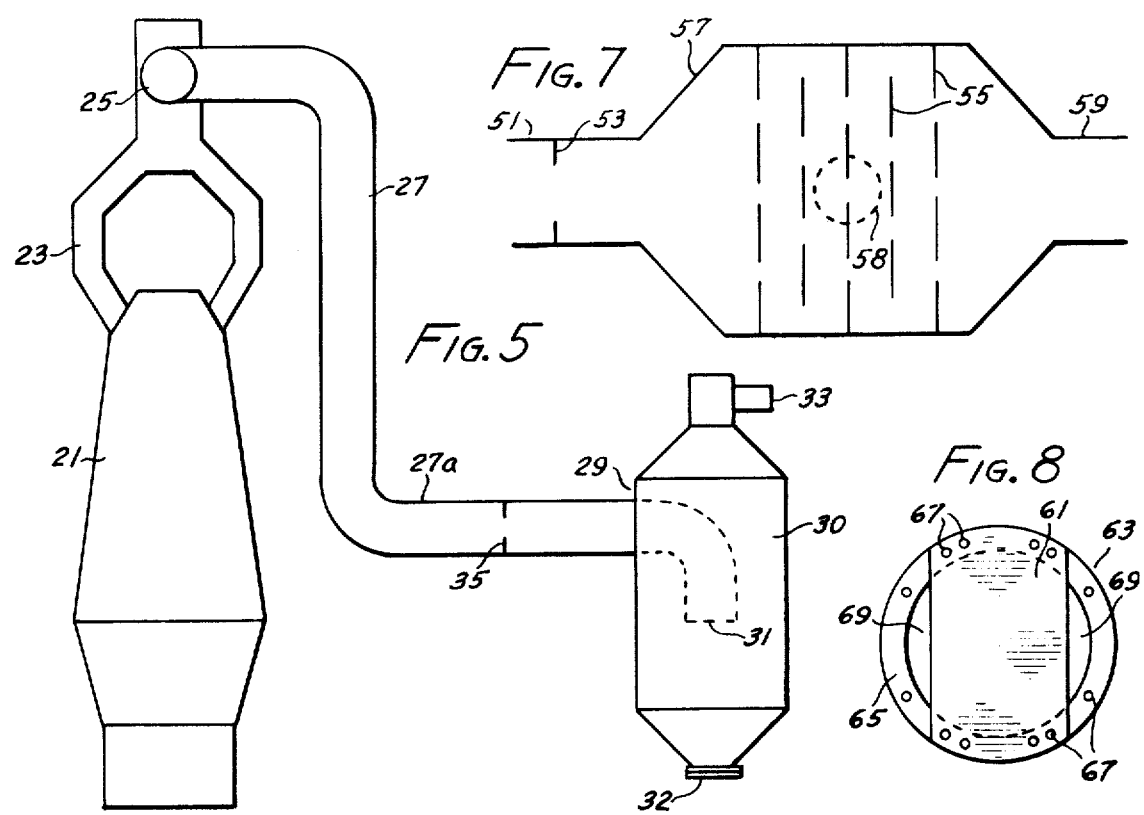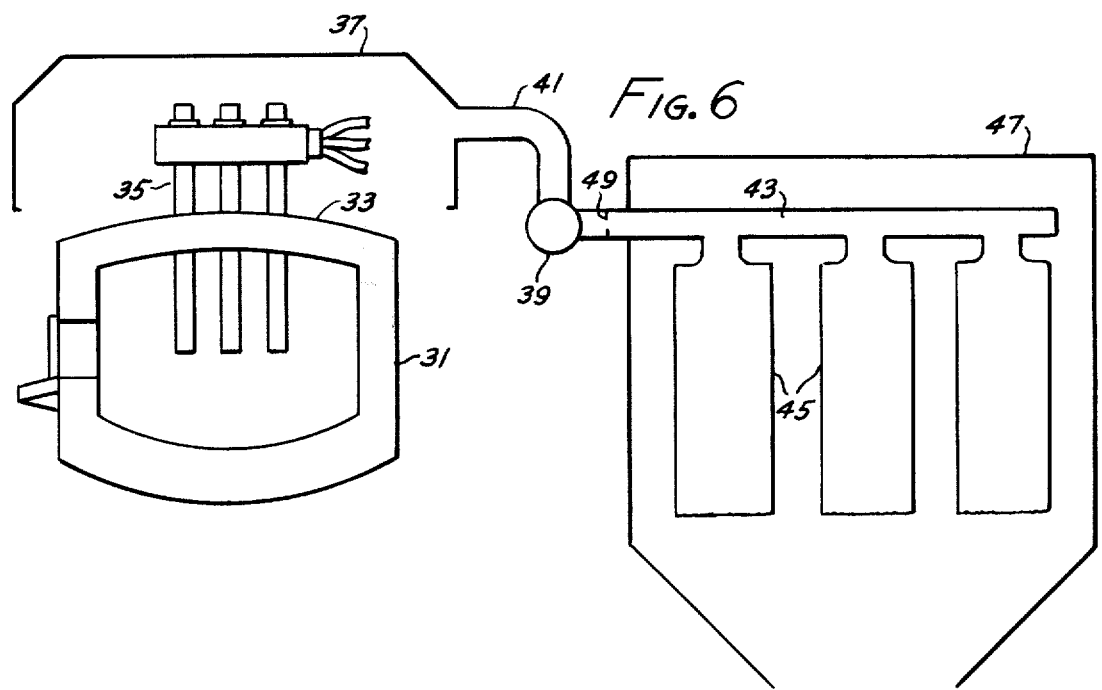

METHOD AND APPARATUS FOR AGGLOMERATING DRY DUST PARTICLES IN A GAS STREAM AND SEPARATION

CROSS-REFERENCE TO RELATED APPLICATIONS

This application is a continuation-in-part of U.S. Patent application Ser. No. 72,931, filed Sept. 8, 1970 now abandoned.

BACKGROUND OF THE INVENTION

The gas blown from many industrial operations such as, for example, blast furnaces and the like, is always heavily laden with an enormous number of small particles. In a blast furnace these small particles are composed of burden material in the form of flue dust. Very fine ores, in particular, give rise to large amounts of flue dust. Such particles will generally vary in size from about one-fourth inch to 0.1 micron (1 micron = 0.00003937 inch). A dust catcher is therefore regularly used in conjunction with blast furnaces in order to remove as much as possible of the flue dust from the gas, and to enable the gas to be used in gas engines and/or for heating without clogging the subsequent apparatus, for example, blast furnace stoves. If this dust were also not removed from the gas, at least in a major part, before being discharged to the atmosphere, it would be a cause of intolerable air pollution. The present invention, by increasing the efficiency of initial dry dust separation, removes an unnecessary load from succeeding wet-cleaning or scrubbing units, and enables the dust to be more readily and economically collected and removed in the dry state from the dust catcher. The invention also enables many dry dust catchers such as cyclones or other centrifugal type dust catchers, baghouses and gravity settling dust catchers such as settling chambers and the like to do such an efficient job that a secondary gas cleaning system may not be needed at all.

Two major types of mechanical dust catchers have been used in the past to remove small particulate matter from gas streams. These two types of systems are the wet or scrubbing systems which depend upon the action of water in various forms such as sprays, mists, sheets of water or the like to scrub the particulates from the gas stream and dry type dust removal systems which remove the dust particles in a dry form. Essentially all the wet systems depend upon water to either wash particles out of the dirty gas stream, much as rain envelopes dust particles in the atmosphere and carries the particles down to earth, or alternatively to wet the particles only sufficiently to cause them to stick or clump together to improve later separation from the gas stream by other apparatus. Some wet scrubbing apparatus thus depends upon a direct washing effect of water sprays or the like to wash particulates out of a gas stream which passes through the washing or scrubbing apparatus either countercurrently to or in some instances at right angles to the water sprays. Other wet scrubbing apparatus may depend upon apparatus such as vortex type separators to remove the water drops and any entrained particulates from the gas stream. Vortex type wet scrubbers, may also in the case of particulates which have been clumped together as the result of wetting, be used to remove the clumped particulates from the gas stream.

In any type of wet scrubbing apparatus except those which use very large amounts of water to form a thin slurry or liquid suspension which can then be pumped to settling devices such as thickeners or the like, the wet particulate material which is finally collected is invariably extremely difficult to handle and dispose of. The wet particulates form a slimy, soggy mass or a hard packed wet cake which is difficult to remove from the primary separating means. It is extremely advantageous, therefore, if as much of the particulate material as possible, if not all such material, can be recovered in a dry powder form rather than as a sticky hard-to-handle sludge or the like.

Dry dust collectors recover particulates in a dry, easy-to-handle form. Dry type dust collectors, however, have in general not been as efficient as wet type collectors precisely because the collected material is not as sticky and has not clumped together. There is and has been, therefore, a clear need to increase the efficiency of dry type dust catchers either to such an extent that wet type collectors are not necessary at all or so that as much particulate material as possible can initially be removed from the gas stream prior to a later wet scrubbing operation.

1. Field of the Invention

The field of art to which this invention pertains is the separation and collection of suspended particles from effluent gas streams in a dry form which will correspondingly diminish the amount of entrained solids entering any subsequent secondary wet gas cleaning operation which uses water or similar diluents. By "dry form" it is meant that the particulate material is not rendered wet to the touch or collected as a wet cake or slurry. It is not intended, however, that the term dry shall exclude those processes where the particulate material is merely slightly humidified by adjustment of the humidity of the gas stream by the addition of a slight amount of moisture to the gas stream but without a definite wetting of the particulate material such as would render the final material collected difficult to handle as a dry material.

2. Description of the Prior Art

A number of dry type gas cleaning devices have been developed in the past such as vortex type apparatus, baghouses, settling or plenum chambers or the like. Such devices have been used to remove particulate materials from gas streams issuing from blast furnaces, electric furnaces, basic oxygen furnaces, pelletizing plants and the like as well as from numerous sources of gas entrained particulates not associated with the steel industry. Likewise a number of similar and dissimilar devices have been used to remove wet particulates from similar gases and sources.

Devices using an orifice between a metallurgical furnace and a dust collector of the wet type have been disclosed previously in U.S. Pat. No. 2,964,304 to Rice, U.S. Pat. No. 3,067,991 to Davy et al. and U.S. Pat. No. 3,093,468 to Krochta for example. The orifice in such devices has been used principally, if not entirely, to initiate turbulence in the gas stream at the point at which washing liquid is injected into the gas stream in order to ensure a thorough mixing of the washing liquid with the entrained particulate matter and a thorough wetting of the particulates with the washing liquid. U.S. Pat. No. 2,604,185 to Johnstone et al. includes an excellent discussion of the theory and operation of wet scrubbing apparatus of this nature using a venturi to cause accelerated impingement of dust particles upon drops of water injected into the venturi and to thoroughly break up the injected water into small drops. No critical relationship of the orifice with surrounding structures is set forth in these patents although Krochta does state that he obtains best results by positioning the orifice immediately adjacent to his vortex type particulate collector. So far as the present applicants are aware no prior use has been made of orifices positioned before a dry type particulate collector or dry dust catcher in order to increase the efficiency of the collector, although there are disclosures of control valves and the like in conduits approaching dry dust separators as for example disclosed in U.S. Pat. No. 1,844,369 to Ross, and the use of orifice plates in conduits broadly for the purpose of measuring the flow of fluids through such conduits, or for various other purposes, are shown in U.S. Pat. No. 1,654,559 to Spitzglass, U.S. Pat. No. 2,455,120 to Hamer and U.S. Pat. No. 2,626,820 to Don et al., to mention only a few such disclosures. The operating principles of wet scrubbers, differ greatly from those of a dry dust catcher. Wet scrubbers usually depend essentially on the use of enormous quantities of clean water sprayed into the gas to be scrubbed. The used water is then required to be treated because it is too polluted for immediate further use, and the flue dust is collected only as a slimy, soggy mass which is hard to handle. The present invention enables the particles of flue dust to be collected and transported in a perfectly dry state, and in much larger tonnages than heretofore, with a regular dry type dust catcher.

SUMMARY OF THE INVENTION

The foregoing problems in the prior art use of both dry dust catchers and wet scrubbers have now in some cases been completely obviated, and in most cases considerably alleviated, by the present invention wherein a constriction, usually in the form of an orifice having an area less than one fourth of the cross sectional area of the conduit in which the orifice is positioned located in advance of a dry dust catcher. A gas stream with contaminating particulate matter entrained therein is passed through the constriction at a velocity of at least 6,000 linear feet per minute. The particulate material is found to agglomerate as it is passed through the constriction, due, it is believed, to differential acceleration of the particulates as the gas stream accelerates in passing through the orifice. It appears that the smaller particles accelerate more quickly than the larger particles due to the additional inertia of the larger or heavier particles and the smaller particles thus impact upon the larger particles causing clumping or agglomeration of the particles together. The agglomerated particles can then be passed into almost any type of dry dust collector and the collector will be found to be considerably more efficient than it would have been prior to such agglomeration. The larger agglomerated particles of dry particulate matter are in all cases easier to separate from the gas stream in which they are entrained than smaller, and particularly very fine, particles and the particles are much easier to handle after separation in their dry form than they would be in a wet sticky form. While the agglomerated particles tend to separate into their original component particles once they are collected in a dry separator, the disruption of the agglomerated particles after collection is usually not disadvantageous since the resulting mixtures of dry particle sizes have been observed, in the case, at least, of material removed from a blast furnace, to be more free flowing and thus easier to handle.

A cyclone type of collector for the dry dust contained in the gas emitted by a blast furnace depends essentially for its efficiency upon the formation of a vortex within its upper annular portion. A cyclone is a device for the creation of a vortex, and it is the vortex which does the work of separating particulate matter from the gas.

The normal linear gas velocity at the inlet to a cyclone dust collector is generally less than about 1400 ft./min. Greater rates of flow have been known to create increases in efficiency to a certain extent, but only up to a rather low limiting velocity, which is stated to be about 4,000–5,000 ft./min. in a recent authoritative book (Air Pollution, edited by A. C. Stern, 1968, vol. III, ch. 43). Above this velocity, it has been considered that the internal turbulence in the gas will increase more rapidly than the dust separation, and any further increases in flow rate will merely cause a loss in efficiency. The theory has been that excessive turbulence in the gas will then lessen or even entirely suppress the vortex, and so reduce or destroy its efficiency as a dust separator.

We have also discovered, quite unexpectedly, that we can obtain a further large increase in the quantity and fineness of dry dust collected in a dust catcher, by substantially increasing over previous limits the velocity of flow in the preceding gas line. We accomplish this by placing in the line a constriction of proper cross-sectional area relative to the line and located at a sufficient longitudinal distance ahead of the dust catcher to smooth out gas turbulence in the line and permit dust particles to become agglomerated. The construction, as noted above, is believed to cause initial agglomeration of dry particulates in the gas stream by differential acceleration of the particulates. We have discovered that when such a constriction is used with a cyclone type dust catcher it should be positioned at least 5 duct diameters and preferably 10 duct diameters from the cyclone.

DESCRIPTION OF THE DRAWINGS

In the annexed drawings.

FIG. 1 is a typical curve showing the relationship between the total tonnage of blast furnace flue dust collected daily in a typical dust catcher and the velocity in linear feet per minute of the gas stream from which the dust was separated in accordance with our invention;

FIG. 2 is a curve which shows the results of dry screen analyses made on samples of flue dust produced with, and also without, an effective plate constriction as described herein;

FIG. 3 is a diagrammatic view in side elevation of an installation which embodies the principles of our invention used with a cyclone type dry dust catcher;

FIG. 4 is a detail view, taken on line 4—4 of FIG. 3, illustrating a form of plate constriction which is especially suited for use in this invention;

FIGS. 5, 6 and 7 are further diagrammatic elevations of alternative embodiments of our invention used with plenum chamber, baghouse, and impact type dry dust separators respectively; and FIG. 8 is a detail view illustrating an alternative form of plate constriction suitable for our invention.

Referring now especially to FIGS. 3 and 4 of the drawings in detail, with regard to a preferred embodiment of this invention, the reference numeral 1 designates a blast furnace such as is conventionally used in the production of pig iron or ferroalloys such as ferromanganese. The hot gases resulting from the smelting operation are conducted from the top of the blast furnace 1 by a plurality of large upright ducts or uptakes 2, the tops of which may be connected together by a cross connection or duct called an offtake (not shown), from which the gases pass to a single large descending duct or downcomer 3.

Downcomer 3 carries the gases expelled from the top of the furnace 1 as described downwardly through an initial ell-shaped gas conducting portion 4, a plate 5 having an orifice 6 which has the effect of a constriction which increases the velocity of the gas after the manner of a venturi, and a final and preferably horizontal extended duct portion 7 of substantial length which delivers the gas tangentially into a cyclone type of dry dust catcher 8.

The cyclone dust catcher 8 is basically a cylindrical structure of considerable size. This structure is equipped with an inverted cone 9 on the bottom wherein the dust is finally collected, and a cone-shaped top 10 from which the gas as cleaned passes to subsequent gas washing units (not shown). Said dust catcher is preferably lined with refractory brick (not shown), which retards cooling of its contents.

In order to provide proper thermal protection, it will be understood that the aforementioned ducts 2, 3, 4 and 7 are also provided with conventional inner linings (not shown) either of refractory bricks or in a monolithic layer of refractory cement. Therefore, when the diameter of a duct, such as the downcomer 3, is given as 7½ feet (or any other dimension), it is the inner diameter of the duct as lined which is intended to be referred to.

The plate constriction shown in FIGS. 3 and 4 is fundamentally a flat steel plate 5 which is bolted between a pair of circular flanges 11 and 12 facing toward each other and connecting successive sections of the downcomer 3. Said plate 5 is provided with at least one middle orifice 6, preferably rectangular and having its long sides vertical as shown in FIG. 4. The ratio which the open area through said orifice should be to the cross-sectional flow area in the downcomer is about 1:4, though smaller orifices may be permissible. During operation of the furnace 1, there will be dust buildup behind the orifice 6 which will further decrease the effective flow area of said orifice 6. This dust buildup is cumulative, and continues until it reaches a time when excessive back pressure and actual clogging of the orifice 6 will occur.

To permit periodical purging or cleaning of the orifice 6, therefore, the plate 5 is preferably provided with a second circular orifice 13 of substantially the full inner diameter of the downcomer 3, which can be moved into position in place of the constricted orifice 6 in order to facilitate the cleaning operation.

As shown in FIG. 4, this change of orifices may be made very quickly and easily by removing from their aligned holes in the flanges 11 and 12 all the securing bolts 14 with the exception of the single upper central bolt 15, and using said bolt 15 as a pivot on which to rotate plate 5 until the desired orifice is in register with the duct, after which step the bolts 14 are replaced in the flanges 11 and 12 so as to resecure the plate. Of course, if space limitations in a particular installation interfere with the change of orifices as above described, the same effect can be had by simply loosening and sliding the plate 5 up or down in an understood manner.

One of the curves illustrating the operation of this invention is FIG. 1, which shows the relationship between linear gas velocity and tops of flue dust collected per day in the dust catcher 8. At gas velocities under 6,000 ft./min., the amount of flue dust collected was substantially constant but quite low, in the neighborhood of 5 tons per day. At velocities in excess of 6,000 ft./min., some dust build-up at the constriction commenced, and the efficiency of dust collection began to rise sharply. Best results occurred at gas velocities between 10,000 and 12,000 ft./min., when the amount of dust collected rose from 20 tons to about 68 tons daily. The pressure drop (65 inches w.g.) across the constriction at 12,000 ft./min. made the use of higher velocities inadvisable in this case. However, pilot plant data (indicated by dotted lines in FIG. 1) further show that the amount of flue dust collected tends to level off about this point when gas velocity is additionally increased.

FIG. 2 shows the results of dry screen analyses made on "regular" dry flue dust and the dust collected with effective plate constrictions, and indicates that a greater percentage of finer material was collected when constrictions were used. For example, 58% of the flue dust collected without a constriction in the line was of sizes larger than 100 mesh (0.0058–0.006 inch), while only 28% of the dust produced with the constriction in the line was larger than 100 mesh. The decrease in the average size of the particulate material as analyzed occurs because the agglomerated particles are evidently easily separated during screening, apparently because the forces holding the particles together are easily broken once the particles are collected. The increase in small particles noted in an analysis of the collected particles is thus closely related to the increase in collection of small particles by the dust catcher. Furthermore, the resulting mixture of particle sizes obtained from a blast furnace appears to be more free flowing. As a result, flue dust produced with an effective constriction is a great deal more free-flowing and easier to remove and dispose of than regular dust, in addition to being collected in much greater total quantity in the dust catcher. The collection of finer particles has the further advantage of lessening the solids loading on clarifiers and vacuum filters in the final stages of subsequent wet gas cleaning operations. It thereby decreases the quantities of water and air required, and also their possible pollution, in these operations. In this manner, the present invention is expected to materially enhance the quality of the environment by contributing to the restoration or maintenance of two of the basic life sustaining material elements, viz., air and water.

It will be recognized that the disclosed constriction merely enables the downcomer to operate as a simple form of venturi. In fact, a venturi is often defined as a duct having a constricted, throatlike passage which serves to increase the velocity and lower the pressure of a fluid conveyed through it, depending on the ratio between cross sectional areas in the duct and throat. Therefore, other similar configurations which include an orifice plate, a venturi, or even a simple pipe reduction, will serve the same purpose, which purpose is simply to increase the velocity of the gas to the desired level of over 6,000 ft./min.

However, it is not sufficient merely to accelerate the velocity of the gas. The practical upper limit on velocity is set by the pressure drop across the constriction, which should not be excessively wasteful of power, or, for example, over about 50 inches of water. Also, it is necessary to allow sufficient linear distance, which we have found must be at least 5 duct diameters and preferably 10 duct diameters upstream of the dust catcher, in order to smooth out and eliminate all effects of internal turbulence due to the high gas velocity in the dust, and also to permit agglomeration of the dust particles.

In fact, we have found by actual experiments that a small orifice which is located directly at the entrance point to a cyclone will produce an efficiency amounting to only about 11% dust recovery (at a velocity of about 10,000 fpm) — which is considerably below the normal efficiency of about 50 to 65% of the same cyclone dust catcher without the use of a preceding orifice — while an orifice of the same size but located ten duct diameters upstream of the cyclone will yield about a 77% recovery of dry particulate material.

We believe that the reason for the increased separation of dry dust from the gas stream when the orifice is placed at a distance of 5 to 10 dust diameters from the entrance to the cyclone is the disappearance of the turbulence occasioned by the orifice in the duct. If this turbulence is not allowed to subside before the gas stream enters the cyclone the efficiency of the cyclone is seriously decreased even below that efficiency at which it would operate without the provision of an orifice in the duct. On the other hand, if the orifice or constriction in the duct is spaced 10 duct diameters from the cyclone the efficiency of separation of the cyclone is vastly improved. It will be seen, therefore, that the important aspect of the distance of the orifice from the cyclone is that the distance be sufficient to avoid all substantial turbulence as the gas enters the cyclone. Authorities recommend that, in order to avoid turbulence in the vicinity of an orifice used for gas volume measurement by acceleration, any taps on the line should be no closer than five duct diameters from the orifice on the downstream side. See for example pages 5-10 of the 4th Edition of Perry's Chemical Engineers Handbook or page 4-18 of the 5th Edition (1963) of the Handbook of Hydraulics by Kinz and Brater. Our data indicate that a distance of the orifice of at least ten diameters from the entrance to the cyclone is very satisfactory and preferable, but that based upon information available in handbooks with respect to the persistence of turbulence after an orifice or constriction, that a distance of five duct diameters will be satisfactory. While information as to turbulence around orifices has been available in the art, prior workers have not realized the significance of turbulence with respect to the placement of orifices adjacent to cyclones. For instance Krochta in U.S. Pat. No. 3,093,468 stated that he prefers to place an orifice next to his dust collector — although Krochta's apparatus is a wet dust collector rather than a dry dust collector.

The reason for the increased dust collection efficiency in the above-described apparatus and method is not completely understood at this time. The abrupt change in velocity caused by the constriction in the gas line, however, evidently results in the agglomeration of fines to a size that can be collected by the dust catcher. We believe that the increase in gas velocity as described accelerates the small particles in the duct more than the large ones, and causes interception by and impaction on the large particles. The impacted particles appear to be then held together by electrostatic, van der Waals or other cohesive forces until they are collected. It will thus be recognized that in order for our invention to be effective, it must, assuming that our theory is correct, be used with gas streams containing entrained particulate material having a variety of sizes. If the particulate material were all of the same size there would be no differential acceleration of the particles and the smaller particles would not collide with and agglomerate with the larger particles.

There is no effective upper limit to the distance of the orifice or constriction in the duct from a cyclone type dry duct catcher other than the practical limitations of conduit length dictated by economics and the distance of the duct catcher from the source of the dirty gas. Once the turbulence in the gas occasioned by the constriction has dissipated the dust catcher can be positioned at any distance beyond this point. Obviously one would not normally position the orifice great distances from the dust catcher, however. Also it must be realized that a practical limit exists to the distance a dirty gas can be forced through a conduit without excessive frictional losses between the gas and the walls of the conduit. There will come a point at which the gas no longer has the energy or velocity to continue to carry the entrained material through the conduit and the particulate material will be dropped out of the gas stream and deposited within the conduit, quite likely, eventually blocking the conduit.

If the constriction or orifice in the conduit of the present invention is not used with a cyclone type dry dust catcher then it is not so important that the constriction be positioned at least 5 duct diameters back from the dust catcher, but it may be positioned in many types of dust catchers, for instance, with a baghouse type dust catcher, right at the entrance to the baghouse.

FIG. 5 shows our invention applied to use with a plenum or settling chamber type dry dust catcher. A blast furnace 21 has a plurality of large uptake ducts 23 which lead into an orifice 25 or cross connecting duct which leads hot particle containing gases into a single large descending duct or downcomer 27. Downcomer 27 leads into a plenum chamber or settling chamber type dust separator 29 where the gases are discharged from an opening 31 in the end of the downcomer 27 — which end portion is shown in phantom within the plenum chamber 30. The sudden increase in the area through which the gas flows as it passes from the opening 31 into the plenum chamber 30 causes a large decrease in the velocity of the gas passing through the apparatus and allows suspended particles in the gas to settle out of the gas stream by gravity. Periodically the bottom plate 32 of the dust catcher can be removed to remove the accumulated dry dust material collected in the bottom of the plenum chamber. The gas stream travels up through the separator 29 and exits either to the atmosphere or to other apparatus through duct 33. Before the dry particle laden gas passes from downcomer 27 into the plenum chamber type dust separator 29 the gas passes through an orifice or other constriction 35 in a horizontal portion 27a of the downcomer 27. The constriction 35 should be not larger in cross sectional area than one quarter of the interior cross sectional area of the portion 27a of the downcomer 27 and should be so dimensioned that the velocity of the accelerated gas passing through the constriction 35 is at least 6,000 linear feet per minute. It is desirable that the position of the constriction 35 shall be far enough from the opening 31 in the end of the downcomer 27 so that all the turbulence within the downcomer occasioned by the gas passing through the constriction will subside before passing into the plenum chamber 30 of the dust separator 29. In other words, the constriction will be desirably positioned at least 5 diameters and preferably 10 diameters from the opening 31 in the end of the downcomer 27. While the position of the constriction is preferably sufficiently far back from the plenum chamber to avoid the injection of turbulence into the plenum chamber, if the chamber is sufficiently large with respect to the size of the downcomer 27 the constriction may be positioned closer to the end of the downcomer. The position thus is not so critical as when used with a cyclone type dust separator as disclosed previously. An excessive increase in size of the plenum chamber over what is required if the orifice is correctly positioned is uneconomic and wasteful, however.

FIG. 6 shows our invention applied to use with a baghouse type dry dust collector. Since our invention increases the average minimum size of particles being collected by agglomerating smaller particles with larger particles and thus decreases the blinding of the pores in the bag fabric by small particles, the length of time between cleaning cycles may be increased thereby increasing overall capacity of the baghouse. Blinding of the bag pores increases inversely with the size of the particles being collected. An electric furnace 31 has a roof 33 through which electrodes 35 extend into the furnace 31. During operation of the furnace 31 large amounts of gases containing particulate materials are given off and are collected by an overhead hood 37. The particle laden gases are drawn from the hood 37, by the suction created by a large centrifugal fan 39, through duct 41, then through the fan 39 and finally discharged into duct 43 from which the gases are directed into porous cloth collector bags 45 which can be replaced or discharged periodically through their bottoms. The collector bags 45 are contained in a baghouse 47 and if it is desired not to pass abrasive dust particles through the fan 39 another suction fan — not shown — can be substituted and connected to the interior of the baghouse 47 to provide an interior reduction in pressure to draw the gases into and through the porous bags 45. An orifice or constriction 49 is positioned in the duct 43 prior to the bags 45. The constriction 49 has a cross sectional area not greater than one quarter of the cross sectional area of the duct 43 and of such dimensions that the gases reach a velocity of at least 6,000 linear feet per minute in passing through the constriction. While it is preferable for the position of the constriction 49 to be some distance back from the intersections of the bag connections with the duct 43, the exact position is not critical since the turbulence in the gas has only a moderate to minimal deterimental effect upon the efficiency of the collection bags. The baghouse illustrated is a very simple type and it will be readily realized that other types of baghouse, for example, where the particle laden gas enters the bottoms of the bags and the bags are periodically shaken to discharge dust from their bottoms, may also be used with the orifice of the invention.

FIG. 7 is a diagrammatic partially broken away plan view of an impact type dust separator used in conjunction with our invention. Dirty gas containing dry particulate material enters through duct 51, passes through an orifice or constriction 53 in duct 51 and then is projected against a series of offset overlapping impact elements or vanes 55 mounted within the dust separator 57. The agglomerated particulate matter falls from the impact elements to the bottom of the dust collector 57 where it can be removed by periodic removal of a bottom plate 58 shown in dotted lines. The cleaned gas passes in a tortuous path past the impact elements and exits from the dust catcher through the exit duct 59. In order to avoid turbulence as the gas enters the dust catcher, which turbulence might interfere with the proper operation of the initial impact elements, the constriction 53 should be at least five duct diameters from the dust catcher.

FIG. 8 shows a cross sectional view through a duct in the direction of an alternative type of orifice construction which we have found to be satisfactory. In FIG. 8 a plate 61 is positioned transversely across a duct 63 at a flange 65. The ends of the plate are made curved to conform to the sides of the duct and the flange 65 is partially cut away to accommodate the ends of the plate. The plate 61 is secured in position at the flange by the flange bolts 67 passing through the plate 61 as well as the flange. The sides of the plate 61 are straight so that a restricted opening 69 in the shape of a chord of a circle is left in the duct on either side of the plate. The combined area of the two chord shaped openings 69 should be not greater than one quarter of the cross sectional area of the opening in the duct as a whole.

While several embodiments of the invention have been illustrated in the several drawings it will be understood that the invention may be useful in other embodiments. The invention broadly comprises the provision of a constriction in a duct carrying a particle laden gas and wherein the constriction has a critical size with respect to the duct size and the velocity of gases issuing through the constriction, as specified above, in order to cause a differential acceleration of different sized particles in the gas to such an extent that forceful impingement of the particles upon each other causes clumping or agglomeration of the particles together to increase the size of the average particles and thus increases the efficiency of collection of the particles in a later dry dust catcher.

It will also be understood that in the case of the apparatus shown in FIGS. 3, 5 and 7 that the cleaned gas which leaves the dry catchers shown, i.e. the cyclone 8, plenum chamber type dry dust catcher 30, or impact separator 57, can either be passed directly to the atmosphere as is, or used in some apparatus such as gas engines or heating apparatus, or, if the number of particles still contained in the gas stream is still too elevated, may be passed to other particle separating apparatus either of a similar or duplicate type or of a different type such as wet dust catchers.

As pointed out above, various types of constrictions in the duct leading to the dry dust catcher may be used in addition to the orifice plates shown in the drawings, for example, venturies and the like. However, since it is believed necessary for the operation of the invention for different sized particulates in the gas stream to be accelerated to different velocities within the gas stream, and particularly for the small particles to be suddenly accelerated while the momentum of the larger or heavier particles prevents them from suddenly accelerating, it will be understood that the necessary constriction in the duct should have a fairly steep entrance and also preferably a steep exit angle. A constriction having a very slowly decreasing cross section, which as a consequence slowly increased the velocity of the gas stream passing therethrough, would not cause sufficient differential acceleration — between the particulates in the gas to cause effective agglomeration. Furthermore, the less the size or weight differential between the various particulates, the steeper must be the angle of increase of the constriction and preferably also the angle of decrease of the constriction. The orifice plates shown in the drawings, of course, provide substantially instantaneous decreases and increases in the cross section of the gas conduit and are thus the most efficient constriction available for the purposes of the present invention, particularly where fairly uniformly sized material is to be separated as a dry particulate material.

It will be understood that while a single orifice plate or constriction has been described and shown in the FIGURES, the invention would also encompass the provision of multiple constrictions in series in a duct or conduit to provide several stages of agglomeration as the dry gas passes through the restrictions. In such case if a cyclone is being used the last constriction must be the required minimum distance from the cyclone.

We claim:

1. A method for removing dry particulate material from a gas stream containing both fine and coarser particulates comprising:
   a. passing the gas stream in a substantially dry state through a gas conduit and through a constriction in said conduit having a cross sectional area not greater than about one quarter of the cross sectional area of the conduit and located within the duct at least five duct diameters upstream from a dry dust collector and having a cross sectional area of the duct and the initial velocity through the duct of the gas stream such as to cause an abrupt increase in velocity of said gas stream at least 10,000 fpm as it passes through the constriction, and
   b. passing the dry gas stream to said dry dust catcher where particles in the gas stream are removed in a dry state.

2. An improved method for removing fine dry particulate material from a gas stream containing both fine and coarser dry particulates comprising:
   a. passing the gas stream containing said fine and coarser dry particulates into and at a predetermined velocity through a conduit having a predetermined cross sectional area,
   b. agglomerating the fine dry particulate material with the coarser dry particulate material by passing the gas stream in a substantially dry state through an abrupt constriction in said conduit having a cross sectional area not greater than one quarter of the cross sectional area of the conduit and having a cross sectional area with respect to the cross sectional area of the conduit and the initial velocity through the conduit of the gas stream such as to cause an increase in velocity of of said gas stream to a velocity greater than about 6,000 to 10,000 fpm as it passes through the constriction whereby the fine particles in the gas stream are accelerated to a velocity sufficiently greater than the coarser particulates such that a substantial portion of the fine particulates impact upon the coarser particulates with a force sufficient to cause agglomeration of the fine particulates with the coarser particulates, and
   c. subsequent to agglomeration of the particulates by passage through the constriction direction the gas stream containing the agglomerated particulates through the conduit into a cyclone type dry dust catcher positioned at least 5 conduit diameters from the said constriction in the said conduit.

3. A method according to claim 2 wherein the constriction in the duct is positioned at least 10 duct diameters from the cyclone.

4. A method of removing fine particles from a gas stream laden with said particles comprising:
   a. moving said gas stream at a predetermined speed toward a vortex type dry dust catcher through a first passageway,
   b. precipitiously increasing the speed of movement of said gas through said first passageway by decreasing the effective cross-sectional area of said passageway by not less than three quarters within a minimal distance and proportional with respect to the cross-sectional area of said passageway and the initial speed of the gas through said passageway such that the speed of movement of said gas is increased to at least 6,000 to 10,000 feet per minute whereby particles of various sizes in the dust stream are momentarily accelerated to different speeds causing interception and impaction of said particles upon each other and agglomeration of said particles together,
   c. passing said gas stream through a second passageway expanded from the size of said constriction for a distance equal to at least 5 times the diameter of the said first passageway to allow turbulence in said gas stream occasioned by said precipitious increase in speed of said gas stream to subside, and
   d. passing said gas stream into said dry vortex type dust catcher.

5. Apparatus for removing dry particulate material from a gas stream in a substantially dry condition, comprising:
   a. a conduit through which the gas stream is passed,
   b. a constriction within the conduit having a cross sectional area not greater than one quarter of the cross sectional area of the conduit and being otherwise dimensioned relative to the velocity of the gas through the conduit such that the gas stream will attain a minimum velocity of 10,000 linear feet per minute through the constriction, and
   c. a dry dust catcher positioned within not less than five duct diameters of the said constriction and into which the gas stream is directed subsequent to passage through the constriction and from which the dry particulates are removed in a dry condition.

6. An improved apparatus for removing dry particulate material from a gas stream containing fine and coarser particulates in a substantially dry condition comprising:
   a. a conduit having a predetermined cross sectional area through which the gas stream is passed at a predetermined velocity in a substantially dry condition, b. an abrupt constriction within the conduit having a cross sectional area not greater than one quarter of the cross sectional area of the conduit and being otherwise dimensioned relative to the velocity of the gas through the conduit such that the gas stream will attain a minimum velocity of greater than about 6,000 to 10,000 linear feet per minute through the constriction whereby when the gas stream passes through said constriction the fine particulates in the gas stream are accelerated to a velocity sufficiently greater than the coarser particulates such that the fine particulates impact upon the coarser particulates with a force sufficient to cause agglomeration of the particulates, and c. a cyclone type dry dust catcher into which the gas stream is directed subsequent to passage through the constriction and from which the dry particulates are removed in a dry condition said dry dust catcher being positioned at least 5 conduit diameters from the constriction in the said conduit.

7. Apparatus according to claim 6 wherein the constriction is positioned at least 10 duct diameters from the cyclone.

8. Apparatus according to claim 7 wherein the constriction in the conduit is an orifice plate.

* * * * *